United States Patent [19]

Freiberger et al.

[11] 4,191,090

[45] Mar. 4, 1980

[54] VACUUM TOGGLE

[75] Inventors: Ronald D. Freiberger, Kokomo; Richard D. Reprogle, Greentown, both of Ind.

[73] Assignee: General Motors Corporation, Detroit, Mich.

[21] Appl. No.: 896,685

[22] Filed: Apr. 17, 1978

[51] Int. Cl.² .......................................... F15B 13/042
[52] U.S. Cl. ........................................ 91/52; 91/468; 137/103
[58] Field of Search .................... 91/52, 468; 137/103, 137/116.5; 123/117 A

[56] References Cited

U.S. PATENT DOCUMENTS

| | | | |
|---|---|---|---|
| 2,774,370 | 12/1956 | McCombs, Jr. ...................... | 137/103 |
| 3,416,408 | 12/1968 | Freiberger ............................ | 91/419 |
| 3,433,130 | 3/1969 | Freiberger ............................ | 91/447 |
| 3,476,018 | 11/1969 | Bratenbough et al. ................ | 91/419 |
| 3,797,512 | 3/1974 | Martin .................................. | 137/116.5 |
| 3,965,223 | 6/1976 | Benjamin et al. .................... | 91/47 X |
| 3,982,553 | 9/1976 | Johnston et al. ..................... | 137/103 X |

*Primary Examiner*—Irwin C. Cohen

*Attorney, Agent, or Firm*—K. H. MacLean, Jr.

[57] ABSTRACT

Automatic temperature control system for vehicles commonly utilize vacuum pressure as a power source to perform various functions such as operating the mode damper which routes hot or cold air through either lower or upper outlets. The vacuum pressure is directed to the vacuum motor or actuator to the mode door by a vacuum switch. Normally, the switch is of the type having a stationary ported member and an overlying member which is movable to interconnect the various ports. Undesirable split modes of operation occur because of either improper placement of the rotatable switch member or excessive leakage thereby. Split mode operation may undesirably cause improper allocation of hot and cold air through upper and lower outlets. The subject application provides a vacuum switching device or "toggle" located between the vacuum switch and the vacuum or actuator motor. It operates in response to vacuum input to modify vacuum pressure so that the signal to the vacuum motor is either low or high, which action eliminates split mode operation caused by more intermediate vacuum pressures.

2 Claims, 3 Drawing Figures

VACUUM TOGGLE

This invention relates to an automatic temperature control in association with automobile air conditioning systems and more specifically to a system utilizing vacuum power to perform a mode change in association with a vacuum "toggle" switch placed between a vacuum switch and a vacuum actuator to prevent split mode operation of the vacuum motor which is characterized by improper air temperature discharge from the upper and lower outlets.

Many automotive air conditioning systems utilize automatic temperature control operative by vacuum pressure to perform various functions. Specifically, it is usually desirable to provide a low level heater outlet for warm air and to provide a high level outlet for cooled air. In modern air conditioning systems, the air is directed to the lower or the upper outlets by action of a vacuum motor which physically moves a mode door or damper. Vacuum actuating pressure is directed to the vacuum mode motor through a rotary type vacuum valve commonly used in automatic temperature control systems. The rotary valve includes a housing having a plurality of ports which extend interiorly to a rotatable selector member. The selector member is apertured so that pivotal movement thereof routes vacuum pressure to the various motors controlling system operation.

Because vacuum systems necessitate close tolerances, there may often be slight leaks between the ports in the switch which can cause undesirable modification of vacuum pressure to cause the associated vacuum motor to produce a split mode of operation. Thereby a damper door is positioned between an open and a closed operative location. This causes the undesirable distribution of hot and cold air to a passenger compartment. The subject application discloses a relatively simple and compact yet efficient device to prevent split modes of operation and consequential improper locating of an air damper.

Specifically, a vacuum "toggle" switch is positioned between a vacuum routing valve and a vacuum motor to accurately locate a mode damper. The vacuum toggle device includes three ports and a movable diaphragm type member therein. In one position the device permits communication between all three ports. In a second position the device blocks communication between an air bleed port and the other ports. All three of the ports are formed with flow restrictive means therein which limits air passage through the device in a manner to provide desirable vacuum pressure transmission to the vacuum actuator. Thus, when a relatively high vacuum signal is received from the selector valve, the vacuum force on the diaphragm member causes it to move against a spring to a position blocking communication with the air bleed port. Thereafter, full vacuum pressure is communicated between the other ports to the vacuum motor. When vacuum pressure drops to a lower level, the spring urges the diaphragm to a position again communicating the three ports. Connection between the vacuum input port with the air bleed port greatly reduces the vacuum pressure level transmitted to the vacuum motor and thus allows it to move to its normally raised position.

Therefore, an object of the present invention is to provide a simple, compact yet efficient vacuum "toggle" switch in an automatic temperature control and located between a vacuum selector valve and a vacuum motor to prevent split mode settings of a vacuum actuated mode function air damper.

A still further object of the present invention is to provide a simple, compact yet efficient vacuum "toggle" switch in an automatic temperature control utilizing vacuum pressure and a vacuum motor to position a mode function air damper. The subject vacuum toggle is placed between the vacuum valve and the vacuum motor and is subject to a range of low, moderate and high vacuum pressure input levels which will move the vacuum motor between first and second positions. The vacuum toggle converts low and intermediate vacuum signals to a low input for the vacuum motor to prevent movement of the motor to a second operative position. At a threshold pressure above an intermediate level, the device operates to increase the vacuum signal transmitted to the motor causing it to fully actuate to a powered position.

Further objects and advantages of the present device will be more readily apparent after a reading of the following detailed description of the specific embodiment shown in the accompanying drawings.

Figure 1:
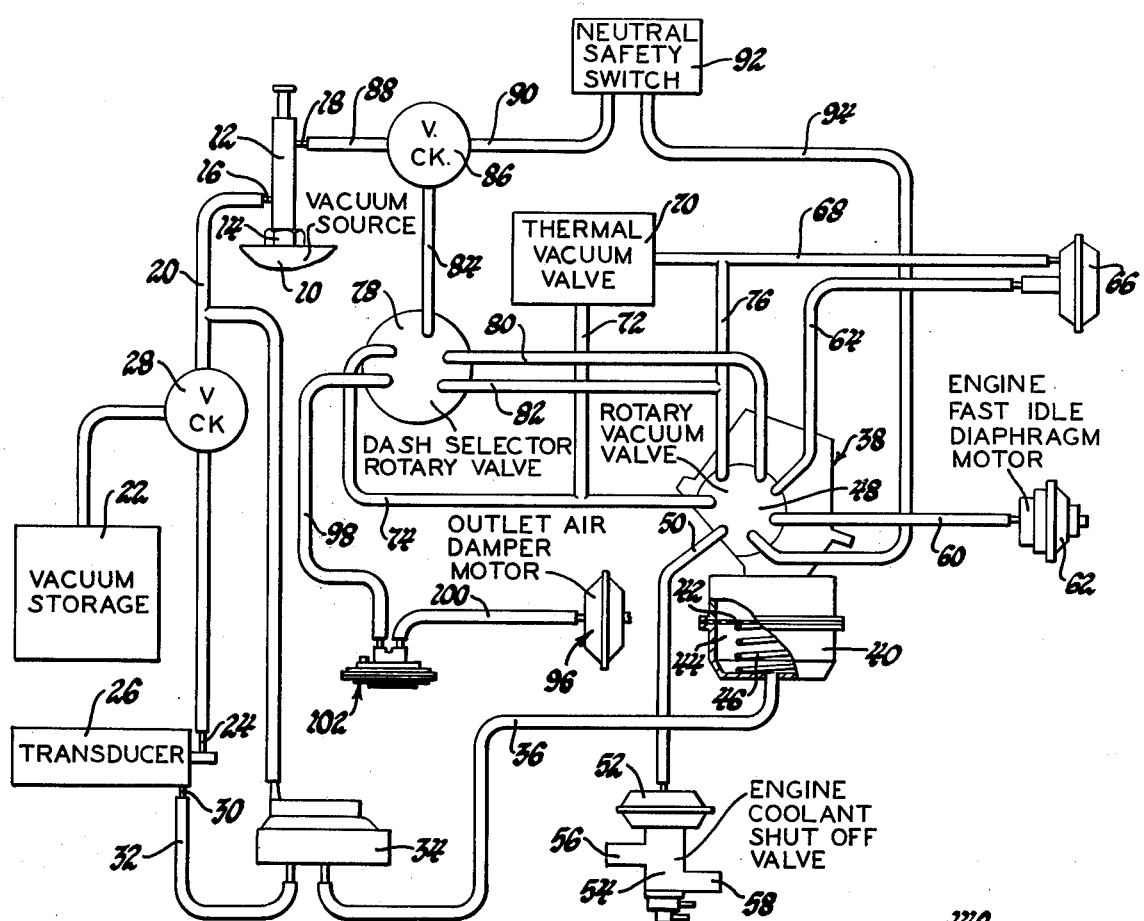
FIG. 1 is a generally schematic view of one type of an automatic temperature control system utilizing vacuum pressure to perform functions and with the subject vacuum toggle switch included.

In FIG. 1, an automatic temperature control system is illustrated for automotive air conditioning. This type of automatic temperature control is typical in utilizing vacuum pressure to perform various functions of the system. Consequently, the following is a brief description of the particular system illustrated but for more detailed information of the specific system, reference is hereby made to U.S. Pat. No. 3,433,130, which issued Mar. 18, 1969 to Freiberger, which was assigned to General Motors Corporation. The components of the automatic temperature control system shown in FIG. 1 are mostly vacuum operated components, although electrical components are commonly utilized in association therewith. Another relevant patent is U.S. Pat. No. 3,263,739 to Gaskill et al also assigned to the General Motors Corporation.

Crude vacuum is received from a vacuum source which likely is the vehicle engine intake manifold 10. A fitting 12 is attached to the manifold 10 by the threaded portion 14 thereof. Fitting 12 includes two inlets 16 and 18 for supplying vacuum pressure. Fitting 16 is connected by a hose 20 to a vacuum storage tank 22 and one port 24 of an electro-mechanical vacuum transducer 26. A vacuum check valve 28 is provided between the fitting 12 and the members 22, 26. The transducer's other fitting 30 is attached by a hose 32 to a port of a vacuum hold device 34. The vacuum hold device 34 is disclosed in more detail in the above-identified patent application. Vacuum pressure is routed from device 34 through a hose 36 to an actuator or power portion of a power control assembly 38. Specifically, the power assembly 38 includes a main vacuum motor 40 in which a movable diaphragm 42 is mounted. An interior chamber 44 is formed thereby which is connected to hose 36 and houses a spring 46 which urges the diaphragm 42 upward in FIG. 1. Thereby, vacuum is communicated from the intake manifold 10 through members 12, 26, 34 to the chamber 44.

The diaphragm 42 of motor 40 is operably connected to a rotary type vacuum switch 48. Switch 48 includes an upper housing visible in FIG. 1 with a plurality of fittings thereon and arranged in a generally circular pattern. The fittings are adapted to be connected by vacuum hoses to different components of the system. Beneath the upper housing of switch 48 is located a rotary element which is operated by movement of an arm extending therefrom. The arm is operably connected to the diaphragm so that as the diaphragm moves upward and downward in FIG. 1, the switch 48 rotates to cause interconnections between the various inlets.

Specifically, the attachments to switch 48 are as follows: one vacuum hose 50 is connected to actuator 52 which is a part of an engine coolant shut off valve 54. The shut off valve includes a fluid inlet 56 and outlet 58 which are connected between the radiator and the heater core. The purpose of device 54 is to selectively block and unblock coolant flow to the heater core as determined by switch 48.

Another vacuum hose 60 extends from the rotary selector valve 48 to an engine fast idle motor 62 which is connected to the throttle linkage of the vehicle engine and is adapted to increase engine speed at idle when the air conditioning system is activated.

A third vacuum hose 64 extends to one port of a vacuum motor 66 which is connected to a damper (not shown). This damper controls the admission of outside air and recirculated air to the heating and air conditioning system. The vacuum motor 66 also includes a second inlet fitting which is attached by a hose 68 to a thermal vacuum valve 70. The thermal vacuum valve 70 is a coolant temperature sensitive device. For more detailed information of its structure and operation, reference is made to the aforementioned patents. Basically, though, the thermal vacuum valve 70 opens at about 100° F. coolant temperature resulting in evacuation of the vacuum motor 66. Consequently, the inlet air damper associated with vacuum motor 66 is moved to a position permitting outside or ambient temperature air to enter the air conditioning and heating system. When the vacuum valve 70 senses temperatures below about 70° F., vacuum motor 66 returns to its former condition. The thermal vacuum valve 70 is itself connected by a hose 72 to the vacuum pressure source through another hose 74. Likewise, a vacuum hose 76 extends between one port of the rotary vacuum valve 48 and hose 68. For further details of the operation of the power assembly 38, reference is made to the aforementioned Freiberger patent.

A second rotary type selector valve 78 is utilized and is a part of a dashboard mounted selector assembly. The rotary valve 78 is very similar to the rotary valve 48 and includes a rotatable valve member covered by a ported member. The movable valve member is mechanically connected to a control which is manually actuated by the vehicle operator in accord with alternate functions of the heating and air conditioning systems. As previously indicated, hose 74 is connected to one of five ports of the other valve 78. A second hose 80 extends between one of the ports of valve 78 and another port of valve 48 is accord with the teachings of the Freiberger and Gaskill patents. Still another fitting of valve 78 is connected via hose 82 to hose 76 which itself is connected between hose 68 and the valve 48. The vacuum hose 84 is connected between a port of valve 78 and a check valve 86. The check valve 86 is connected by hose 88 to the intake fitting of member 12. From the check valve 86, a vacuum hose 90 extends to neutral safety switch 92. The neutral safety switch 92 is connected by hose 94 to valve 48. Switch 92, in conjunction with the setting of the power unit 40, influences the operation of engine fast idle motor 62. For further details, the aforementioned patents should be consulted.

Figure 2:
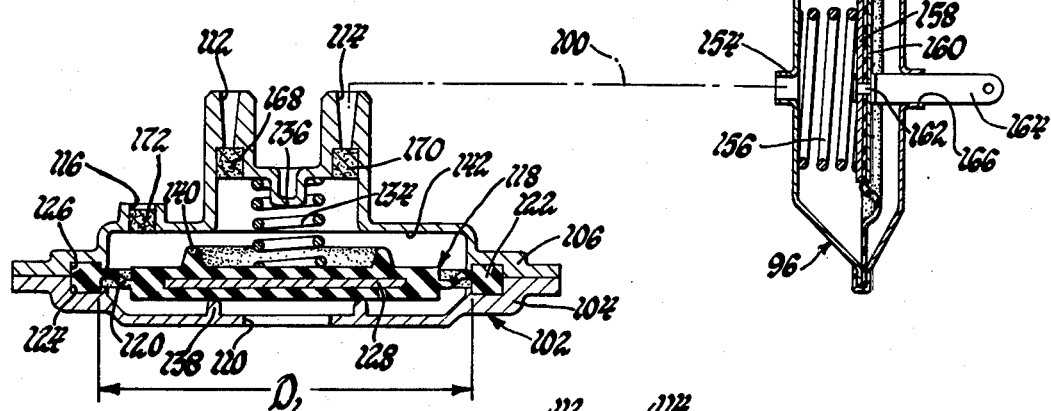
FIG. 2 is an enlarged view of the subject vacuum toggle switch and an associated vacuum motor utilized to move an air duct to direct air through either lower or upper outlets.
Figure 3:
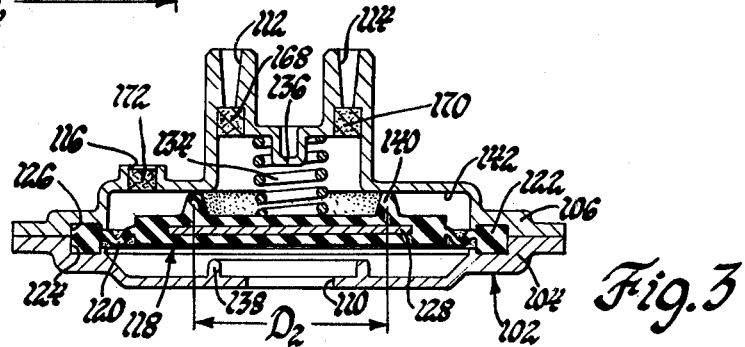
FIG. 3 is a view similar to FIG. 2 but showing the vacuum toggle switch in another operative mode or position.

The automatic temperature control system includes a final vacuum motor 96. Motor 96 is operably connected to a mode door or air damper of the air conditioner and heating system. The function of the mode door is to either direct heated air out of a lower level outlet or opening during the heating mode or to direct cooled air out of an upper level outlet or opening during an air conditioning or cooling mode of operation. The vacuum motor 96 is connected by hoses 98 and 100 to one port of the rotary valve 78. The vacuum pressure is transmitted between hoses 98, 100 through a vacuum switching or "toggle" device 102, details of which are shown in FIGS. 2 and 3. The vacuum toggle device 102 has a specific function, described more fully hereinafter.

Referring particularly to FIGS. 2 and 3, the vacuum switch or toggle 102 consists of two housing members 104 and 106 attached in sandwich fashion together at the edge periphery. The lower member 104 has a central port or opening 110 therein and the upper housing member 106 has three openings or ports 112, 114 and 116 therein. The ports 112, 114 and 116 are connected, respectively, to hoses 98, 100 and to the atmosphere. The interior of toggle switch 102, which is formed between the housing members 104, 106 is divided by a diaphragm assembly 118. Assembly 118 includes a resilient member 120 of elastomeric material which has a thickened peripheral edge 122 captured within circular channels 124, 126 in member 104 and 106. Assembly 118 also includes an internal stiffener 128. A coil type compression spring 134 extends between a central locating portion 136 of upper member 106 and the midportion of the diaphragm assembly 118. Spring 134 biases the diaphragm downward against a circular ridged portion 138. The diaphragm assembly 118 is movable against the action of coil spring 134 to the position shown in FIG. 3 causing the upper surface of assembly 118 to engage the interior surface 142 of upper housing member 106. Specifically, a circular ridged portion 140 seats against surface 142.

In the position shown in FIG. 3, assembly 118 blocks communication between the ports 112, 114 and the port 116. Opening 110 in the housing member 104 permits the passage of atmospheric air to one side of diaphragm 120 so that the assembly 118 moves easily upwards and downwards without the need to overcome interference from trapped air below the diaphragm.

Hose 100 is connected to the vacuum motor 96 shown best in FIG. 2. The motor 96 consists of two housing members 144 and 146 joined at their peripheral edge portions by turned-over portion 148. A diaphragm member 150 is engaged by turned-over portion 148 at its periphery and it extends across the space between members 144 and 146. A space between the member 144 and diaphragm 150 is adapted to be a vacuum chamber 152 to which the second port or opening 114 of toggle 102 is connected. A port is formed by an outwardly turned portion 154 of housing member 144 to accept the end of the hose 100. A coil type spring 156 situated within the vacuum chamber 152 normally biases diaphragm 150 to the right in FIG. 2. One end of spring 156 rests against one member 158 of a back-up assembly. The other member 160 of the back-up assembly is attached to member 158 by rivet fastener 162. Fastener 162 is also attached to an elongated actuator or link member 164 extending through opening 166 in member 146. Link 164 is adapted to be connected to an air dampener such as a mode door as has been previously discussed.

In the air conditioning system, the vacuum motor 96 is designed to move the associated mode door to a seated position with an application of vacuum pressure of at least four inches of mercury (this corresponding to full leftward movement against coil spring 156 in FIG. 2). Likewise, vacuum motor 96 is designed to permit movement of the associated mode door to a fully open position with the application of a vacuum pressure of one inch of mercury or less (this corresponds to movement of diaphragm 150 to the right in FIG. 2). Prior to the use of the vacuum toggle switch 102, vacuum levels applied to vacuum motor in a range between one and four inches of mercury would likely result in an intermediate positioning of the mode door. This might cause undesirable air discharges from the upper and lower outlets. It is desirable, therefore, to transmit high vacuum pressures to motor 96 during one mode of operation. For this, a pressure of six inches of mercury at a flow rate of about 1 cubic foot per hour is desirable. Likewise, it is desirable to produce a reduced vacuum level during the other operational mode. Thus, a pressure of less than one inch of mercury is desirable.

The vacuum toggle switch 102 provides the aforementioned desired transmission of vacuum pressure. Ports 112, 114 and 116 define openings in which are located sintered metal restrictors 168, 170 and 172 which are adapted to provide specified vacuum levels at specific flow rates.

In the device as illustrated the toggle 102 is designed to move from the open mode (FIG. 2) to the closed mode (FIG. 3) when a vacuum of more than one inch of mercury is applied to the diaphragm as determined by diameter D1. Conversely, the toggle is designed to move from the closed mode (FIG. 3) to the open mode (FIG. 2) when the vacuum on diameter D2 is four inches of mercury or less. Since one inch and four inches are the design parameters, the ratio of diameters is determined by the formula: $(D2/D1)^2 = \frac{1}{4}$. By resolution, $D2 = D\frac{1}{2}$. In the specific embodiment, D2 is 13.5 millimeters and D1 is 27 millimeters. Also, the spacing between ports 112 and 114 is 7.5 millimeters. This is the minimum distance conductive to attaching the vacuum hoses 98 and 100 to the ports.

The flow characteristics of the toggle device are determined by the restrictors 168, 170 and 172 in terms of vacuum flow: restrictors 168 and 170—5 inches mercury with one cubic foot per hour flow; and air bleed or restrictor 172—1 inch mercury with 1 chf. flow. The coil spring 134 has an outer diameter of 0.335 inch and includes 8 active turns with 10 total. The free spring length is 0.69 inch. In the open mode (FIG. 2) the spring is compressed to 0.30 inch. The spring rate is 1.1 pounds per inch from 0.0223 inch diameter spring steel wire. The spring force on the diaphragm at the open position is almost 0.5 pounds. The diaphragm moves only about 0.04 inch from open to closed positions.

OPERATION

As previously mentioned, vacuum motor 96 is designed to require about 4 inches of mercury to move from a relaxed position (to the right in FIG. 2) to a second position (to the left in FIG. 2). Vacuum levels greater than one inch mercury may move the diaphragm from the relaxed position. The dimensions and characteristics of the vacuum toggle device 102 are set forth above and are adapted to transmit a high level of vacuum pressure (greater than 4 inches mercury) to the vacuum motor 96 in response to a vacuum signal to the port 112 of moderate to high vacuum levels (4 inches or more). Moderate to high vacuum levels include vacuums of a range between 4 and 6 inches of mercury. Of course, more than 6 inches of mercury may be transmitted and these levels would be characterized as high vacuum. When a vacuum level of about 1 inch of mercury or greater is applied to the upper surface of diaphragm assembly 118 on the area defined by D1, the pressure therein is sufficient to overcome the vacuum breaking air bleed through the port 116 and cause a differential pressure thereacross sufficient to move the diaphragm upward to the closed position shown in FIG. 3. In the closed position, portion 140 seats against surface 142 and blocks communication between the ports 112, 114 and the bleed port 116. When the bleed port 116 is cut-off, vacuum pressure increases above the diaphragm. This vacuum signal is applied to the vacuum motor 96 through hose 100 and causes diaphragm 150 and motor 96 thereof to move leftward to the fully closed position of an associated mode door. When the vacuum valve 78 is reset to cause the vacuum level communicated through port 112 to decrease below 4 inches of mercury, the differential pressure on the area of the diaphragm assembly 118 defined by diameter D2 is reduced and consequently is insufficient to hold the diaphragm in the closed position of FIG. 3. Thereafter, spring 134 forces the diaphragm downward to the open position shown in FIG. 2.

Thus, it can be easily seen how the toggle device 102 operates to prevent the previously defined split mode operation. If, for instance, there is slight leakage in the selector valve 78, and a less than moderate vacuum signal of only 3 inches mercury, there may result an input of .5 inches mercury. This 3 inch level will be insufficient to hold the diaphragm in its closed mode position against the force of the spring 134. Therefore the diaphragm will drop and thereafter a considerably lower vacuum level will be applied through port 114 to the vacuum motor 96 due to the bleed through port 116. As a result, the vacuum motor 96 is maintained in one operative mode. It is only when the vacuum signal transmitted to port 112 is of a moderate level (greater than 4 inches mercury) that the device 102 will move to the closed mode shown in FIG. 3. Thereby, air bleed through port 116 is terminated and vacuum pressure communicated through port 114 is sufficient to move the motor 96 to an operative position (diaphragm 150 fully to the left in FIG. 2).

Although only one embodiment of the subject toggle switch has been described in great detail and fully illustrated, modifications are contemplated which would be included in the definition of the invention and not falling outside the scope of the following claims. In particular, the atmospheric bleed port 116 can be modified by forming a small opening near the outer edge of the thin diaphragm member 120.

What is claimed is as follows:

1. In combination, a source of variable vacuum pressure, a two-position vacuum-powered actuator movable between a rest position and a fully energized position by an increase of vacuum pressure applied thereto from a low level to a moderate level, and a vacuum switching device comprising: a housing with an interior space; a member in the interior space being movable in response to vacuum pressure changes from a first position to a second position, said member being cooperative with said housing to define an air flow passage; said housing having first and second inlets to said flow passage connected respectively to said variable source of vacuum pressure and to the vacuum powered actuator; said movable member in said first position having a predetermined large pressure responsive area exposed to vacuum pressures communicated through said first inlet, means defining a bleed inlet to said flow passage whereby vacuum pressure communicated to said flow passage through said first inlet is significantly reduced by air bleed resulting in an insufficient vacuum transmittal through said second inlet to said actuator to move it from its rest position until the vacuum pressure communicated to said first inlet substantially exceeds said moderate level whereby a predetermined high vacuum pressure communicated to said first inlet, even as reduced by air bleed, is sufficient to act on said large pressure responsive area to cause movement of said movable member into said second position; means operably associated with said housing and said movable member to prevent air bleed when said movable member is in its second position, thereby effectively increasing the vacuum pressure level communicated to said actuator sufficient to cause full movement from its rest position to its energized position; said air bleed preventing means simultaneously reducing the area of said movable member exposed to vacuum pressure to a predetermined small pressure responsive area when in said second position to thereby permit return of said movable member to its first position when the pressure level communicated to said first inlet is decreased a predetermined amount below said moderate level, thereby re-establishing air bleed to said first inlet and reducing the vacuum pressure level transmitted to said actuator permitting its full return to the rest position.

2. In combination, a source of variable vacuum pressure, a two-position vacuum-powered actuator movable between a rest position and a fully energized position by an increase of vacuum pressure applied thereto from a low level to a moderate level, and a vacuum switching device comprising: a housing with an interior space; a member in the interior space being movable in response to vacuum pressure changes from a first position to a second position; said housing having first, second and third inlets to the interior space connected respectively to the variable vacuum source, the vacuum-powered actuator and the atmosphere; said movable member and said housing defining an air flow passage between said inlets; said movable member in said first position having a predetermined large pressure responsive area exposed to vacuum pressures communicated through said first inlet; yieldable means urging said movable member toward the first position in which air is free to bleed from said third inlet to said first inlet, thereby reducing vacuum pressure on said large pressure responsive area of said movable member and the vacuum pressure transmitted to said vacuum actuator through said second inlet; said yieldable means and said inlets being strength designed and flow sized, respectively, to produce a vacuum pressure in said flow passage insufficient to move said movable member to said second position against said yieldable means until vacuum pressure communicated to said first inlet substantially exceeds said moderate level whereby a predetermined high vacuum pressure communicated to said first inlet, as reduced in said flow passage by air bleed from said third inlet, is sufficient to act on said large pressure responsive area to cause movement of said movable member into said second position; means operably associated with said movable member and said housing to block communication between said third inlet and said other inlets when said movable member is moved into said second position, thereby rapidly producing an increase in vacuum pressure by terminating air bleed and resultantly causing full movement of the actuator from its rest to its energized position; said blocking means simultaneously reducing the area of said movable member which is exposed to vacuum pressure to a predetermined small pressure responsive area when in said second position, thereby causing said yieldable means to return said movable member to its first position when the pressure level communicated to said first inlet is decreased a predetermined amount below said moderate vacuum pressure level, thereby reestablishing air bleed to said first inlet and reducing the vacuum pressure level transmitted to said actuator resulting in its full return to the rest position.

* * * * *

UNITED STATES PATENT AND TRADEMARK OFFICE
CERTIFICATE OF CORRECTION

PATENT NO. : 4,191,090

DATED : March 4, 1980

INVENTOR(S) : Ronald D. Freiberger & Richard D. Reprogle

It is certified that error appears in the above-identified patent and that said Letters Patent are hereby corrected as shown below:

Column 1, line 64, "raised" should read -- biased --.

Column 5, line 17, "open" should read -- opened --.

Signed and Sealed this

Fifteenth Day of July 1980

[SEAL]

Attest:

SIDNEY A. DIAMOND

Attesting Officer

Commissioner of Patents and Trademarks